UNITED STATES PATENT OFFICE.

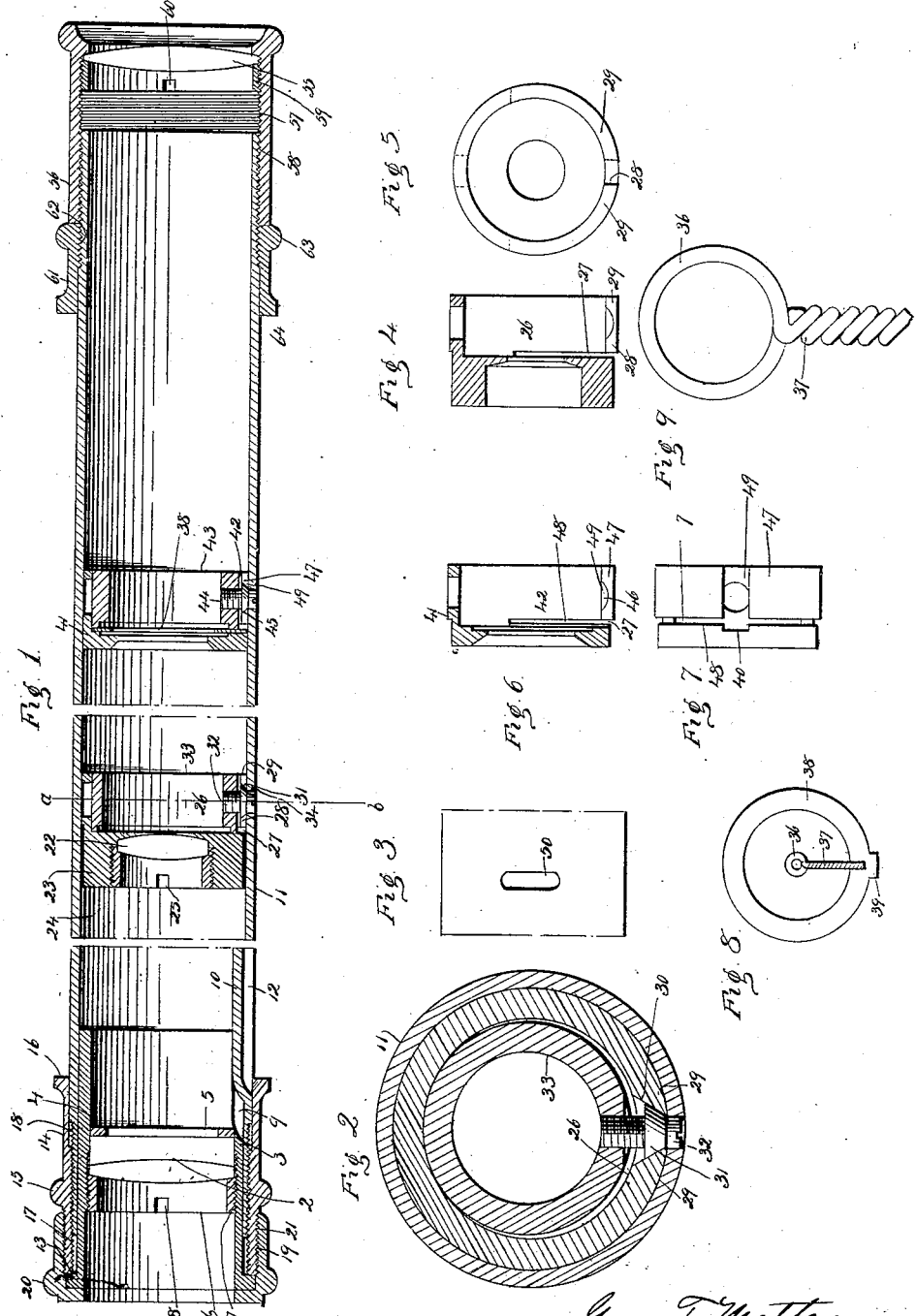

GEORGE FRANKLYN MATTESON, OF NEW HAVEN, CONNECTICUT, ASSIGNOR TO WINCHESTER REPEATING ARMS CO., OF NEW HAVEN, CONNECTICUT, A CORPORATION.

TELESCOPE-SIGHT FOR FIREARMS.

No. 912,011.     Specification of Letters Patent.     Patented Feb. 9, 1909.

Application filed March 11, 1908. Serial No. 420,405.

*To all whom it may concern:*

Be it known that I, GEORGE FRANKLYN MATTESON, a citizen of the United States, residing at New Haven, in the county of New Haven and State of Connecticut, have invented a new and useful Improvement in Telescope-Sights for Firearms; and I do hereby declare the following, when taken in connection with the accompanying drawings and the numerals of reference marked thereon, to be a full, clear, and exact description of the same, and which said drawings constitute part of this specification, and represent, in—

Figure 1 a view in central longitudinal section of a telescope sight constructed in accordance with my invention, the front and rear mounts not being shown, and portions of the tube being broken away. Fig. 2 a view in transverse section on the line *a—b* of Fig. 1 through the middle lens cell, showing the means provided for frictionally securing it in place in the tube. Fig. 3 a broken reverse plan view of the tube, showing the transverse slot formed in it for access to the binding-screw carried by the retaining-ring of the reticule holder. Fig. 4 a detached sectional view of the middle lens cell. Fig. 5 a view thereof in rear elevation. Fig. 6 a sectional view of the reticule holder. Fig. 7 a reverse plan view thereof. Fig. 8 a a detached view in elevation of the reticule and reticule carrying ring. Fig. 9 a detached view of the reticule enlarged.

My invention relates to an improvement in telescope sights for firearms, the object being to provide simple, convenient and accurate means,—for the positive and minute relative adjustments of the lenses and reticule as may be required for the accurate focusing of the image at the reticule at all ranges, for the adjustment of the rear or ocular lens relative to the reticule in order to accommodate emmetropic, myopic and hypermetropic eyes, for changing the reticule as may be required by the varying relative sizes of regular bull's-eyes at standard ranges so that uniform margins between the reticule apertures and the images of the bull's eyes may be maintained, and for cleaning the lenses and reticule and restoring them to place after cleaning them without disturbing the adjustment of any part of the sight.

A further object of my invention is to provide an aperture reticule furnishing the smallest aperture with the smallest obstruction of the field.

With these ends in view, my invention consists in a telescope-sight for firearms having certain details of construction and combinations of parts as will be hereinafter described and pointed out in the claims.

For convenience of description I will begin with the front end of the telescope in describing the several features of my improvement.

In carrying out my invention as herein shown, I provide a micrometer adjustment for the front or objective lens 2 which is mounted in a relatively long sleeve 3, to be hereinafter designated as the front lens cell, formed to the rear of its longitudinal center with an annular shoulder 4 which positions a thin sheet metal ring 5 forming the front lens diaphragm. The lens is held against this diaphragm by a lens-retaining ring 6 the external threads of which take into internal threads 7 in the cell 3, the front edge of the ring 6 being formed with two screwdriver slots 8. The rear end of the cell 3 is formed with an external, longitudinally arranged registering or collimating groove 9 which receives the forward end of an internal rib 10 produced within the telescope tube 11 by the formation of a long groove 12 in the lower face of its forward end. The said groove 12 functions in connection with the front mount of the telescope which constitutes no portion of my present invention and is not shown.

When the cell 3 is inserted into the front end of the tube 11 the groove 9 is registered with the rib 10 which thereafter prevents the cell from turning in the tube and secures the axial alinement of the cell in the tube and also provides for the invariably correct positioning of the cell therein. At its forward end the cell 3 is provided with an annular locking flange 13 whose rearward surface engages with the front surface of adjusting sleeve 14 and whose forward surface engages with the cap 20. The adjusting sleeve 14 is provided with internal threads 17 of fine pitch taking into corresponding external threads 18 upon the front end of the tube 11. External threads 19 upon the front end of the sleeve 14 are provided for the reception of the cap 20 having corresponding internal threads 21. Means are thus provided for a positive forward and backward micrometer adjustment of the cell and hence the objective lens according to the requirements of the range and locking the cell in its required position by turning the cap which also functions as a jam nut. The sleeve 14 is also provided with a knurled annular operating rib 15 and with an annular stop shoulder 16 which coacts with the front mount of the telescope to limit the rearward motion thereof when the same is pulled back through the mount by hand.

Coming now to the middle lens 22, it is mounted in a cell 23 to be hereafter designated as the middle lens cell, the forward end of which is a trifle smaller in diameter than its rear end. This cell might also be called a lens-holder. The forward end of this cell is formed with a concentric chamber for the reception of the lens and internally threaded for the reception of an externally threaded lens-retaining ring 24 having screwdriver slots 25 in its front edge. To hold the cell 23 firmly in position within the tube 11, its rear end is formed with a large concentric chamber 26 and partially separated from the front end of the cell by means of a deep transverse narrow slot 27 intersected upon the lower face of the ring by a wide slot 28. These two slots result in the production of two corresponding spring arms 29 having their free ends separated by the slot 28 and formed upon their upper corners with bevels 30 which coact with an annular bevel 31 upon the head of a screw 32 carried by a ring 33 fitting loosely within the chamber 26 in the rear of the cell. The lens 22 having been introduced into the cell 23, and secured by lens retaining ring, the cell is introduced into the tube and moved along therein until the screw 32 is registered with a hole 34 in the lower face of the tube 11. A screw driver is then inserted through the hole 34 and applied to the screw whereby the same is turned outward until its bevel 31 coacts with the bevels 30 of the arms 28 so as to spread them apart and cause them to firmly take hold of the interior walls of the tube 11 so as to lock the cell therein by friction. If it is desired to change the position of the cell 23 longitudinally, that may be provided for by forming an elongated slot 35 as indicated by broken lines in Fig. 3, in place of the screw hole 34.

To fulfil ideal conditions, the reticule of a telescope sight for firearms sometimes requires a very small aperture with the smallest possible obstruction of the field. To meet this requirement I make the aperture reticule out of exceedingly fine wire, as fine, let us say, as two-thousandths of an inch in diameter. As shown in Figs. 8 and 9, the aperture reticule consists of a wire ring 36 on a wire stem 37 formed by twisting the ends of the wire upon each other, the stem 37 being secured to a flat sheet-metal reticule-carrying ring 38 having a locking-tongue 39 entering a locking recess 40 in the reticule-holder 41 which is constructed differently in detail but on the principle of the middle lens cell 23. The said holder 41 is formed in its rear end with a chamber 42 for the reception of a ring 43 corresponding to the ring 33 and carrying a screw 44 having a bevel 45 to coact with bevels 46 formed in the inner corners of two springs arms 47 produced by forming slots 48 and 49 in the holder 41, these slots corresponding to the slots 27 and 28 in the cell 23. The said reticule-carrying ring 38 is placed against the front wall of the chamber 42 and held against rotation by the entrance of its locking lug 39 into the locking recess 40 aforesaid, which is located in front of the slot 48 and in line with the slot 49, the reticule-carrying ring being held in this position by the bearing of the front edge of the ring 43 upon its rear face. The reticule-holder 41 is introduced into the tube 11 and moved along therein until the screw 44 is registered with a transverse slot 50 in the lower face of the said tube. A screw-driver inserted through the said slot is now used to unscrew the screw the bevel 45 of which coacts with the bevels 46 of the arms 47 which are thus sprung apart and jammed against the interior walls of the tube 11 until the holder 41 is firmly bound in place. The form and arrangement of the slot 50 permit the holder to be oscillated in the tube 11, if desired, before it is secured in place, as described, by springing the arms 47.

As thus constructed the aperture may be of the smallest possible size, while its stem is so small as to take up the least possible space in the field. An aperture reticule thus made and mounted in the ring 38 may be readily interchanged with other reticules having larger or smaller apertures as required by varying sizes of bull's-eyes and ranges. In other words, as the relative size of standard bulls's-eyes at standard ranges vary and consequently vary the size of the image at the reticule, it becomes necessary to change the aperture reticule in order to maintain uniform margins between the apertures and the images of the bull's-eyes.

It will be apparent that by using wire, a smaller aperture reticule may be obtained than would be practicable to secure in a reticule made of sheet metal. Furthermore a reticule-support made of wire may have a smaller area than practical in a sheet metal reticule support, it being imperative that the support shall be reduced to the smallest possible bulk in order to take up the least space in the eld. Furthermore by using wire I secure for the aperture reticule a smooth surface, whereas aperture reticules made of sheet metal have ragged edges, which under the lenses are so enormously magnified as to be objectionable and collect particles of dust which on being magnified, interfere with the vision. Other forms of reticules, such as cross hairs may be attached to ring 38 and interchanged in reticule holder 41.

The rear lens or ocular 55 is mounted in a cell 56 having an internal micrometer thread 57 taking into a corresponding external thread 58 on the rear end of the tube 11, the said lens being held in place by means of an externally threaded lens-retaining ring 59 having screw-driver slots 60. The range of threads 58 upon the tube 11 provides for adjusting the ocular 55 as may be required for normal, near-sighted or far-sighted eyes. The cell 56 is secured in place by means of a locking-sleeve or jam nut 61 having internal threads 62 corresponding to the threads 58. At its rear end the nut 61 has a knurled rib 63 by means of which the sleeve is turned and brought to a bearing against the forward end of the cell 57 for locking the same as set. At its forward end the sleeve 61 is formed with an annular stop shoulder 64 which engages with the rear mount of the sight and limits the forward movement of the sight when the same is pushed forward by hand.

The rear end of the sleeve 14 and the front end of the sleeve 61 and adjacent parts of the tube 11 are graduated to aid in adjusting the telescope sight and also provide means for recording and duplicating adjustments for particular conditions.

I claim:—

1. In a telescope sight, the combination with a tube having its forward end struck inward to form an integral internal rib, of a lens cell having in its exterior surface a shallow groove receiving the said rib for positioning the cell which is held against rotation but left free to move back and forth, and means for adjusting the cell back and forth as required for setting the lens for different ranges.

2. In a telescope sight, the combination with the tube thereof, of a lens cell formed with a laterally movable arm, and means for moving the said arm against the interior wall of the tube for binding the cell in place therein.

3. In a telescope sight, the combination with the tube thereof, of a lens cell having a laterally movable arm, a ring in the said cell, and a screw carried by the said ring and coacting with the said arm for laterally moving the same for binding the cell in position within the tube.

4. In a telescope sight, the combination with a tube having a hole therein, of a lens cell having its rear end chambered and formed with two laterally movable arms, a ring inserted within the said chamber, and a screw carried by the said ring and coacting with the ends of the arms for laterally moving the same to bind them against the interior wall of the tube, the said screw being operated through the hole formed in the tube.

5. In a telescope sight, the combination with the tube thereof, of a lens cell having a laterally movable arm, a ring located within the cell, and a screw carried by the said ring and formed with a bevel for coaction with the said arm for forcing the same outwardly to bind the cell in place.

6. In a telescope sight, the combination with the tube thereof, of a holder formed with a movable arm in the said tube, a ring in the said holder, and a screw carried by the ring for coaction with the said arm for moving the same and thus frictionally holding the holder in place within the tube.

7. An aperture reticule for telescope sights, made from a single piece of wire and comprising a ring and a twisted stem.

8. In a telescope sight for firearms, the combination with a tube, of a flat sheet-metal reticule-carrying ring provided with an outwardly projecting integral locking-finger, a reticule applied to the said ring, and a reticule holder frictionally secured in place within the tube of the telescope and formed with a recess to receive the said locking-finger.

In testimony whereof, I have signed this specification in the presence of two subscribing witnesses.

GEORGE FRANKLYN MATTESON.

Witnesses:
  DANIEL H. VEADER,
  THOMAS C. JOHNSON.